US012756177B2

(12) United States Patent
Subramanian

(10) Patent No.: US 12,756,177 B2
(45) Date of Patent: Oct. 6, 2026

(54) DC FAULT MANAGEMENT IN ELECTRICAL POWER SYSTEM

(71) Applicant: Hitachi Energy Ltd, Zürich (CH)

(72) Inventor: Sasitharan Subramanian, Ludvika (SE)

(73) Assignee: HITACHI ENERGY LTD, Zürich (CH)

( * ) Notice: Subject to any disclaimer, the term of this patent is extended or adjusted under 35 U.S.C. 154(b) by 186 days.

(21) Appl. No.: 18/885,218

(22) Filed: Sep. 13, 2024

(65) Prior Publication Data

US 2025/0096557 A1 Mar. 20, 2025

(30) Foreign Application Priority Data

Sep. 19, 2023 (EP) .................................... 23198367

(51) Int. Cl.
*H02H 7/00* (2006.01)
*H02H 7/12* (2006.01)
*H02H 7/26* (2006.01)

(52) U.S. Cl.
CPC .......... *H02H 7/1213* (2013.01); *H02H 7/268* (2013.01)

(58) Field of Classification Search
CPC .................................................... H02H 7/1213
See application file for complete search history.

(56) References Cited

U.S. PATENT DOCUMENTS 10,637,371 B2 * 4/2020 Subramanian ........ H02M 7/483
11,437,927 B2 * 9/2022 Chen .................. H02M 1/4233
12,278,480 B2 * 4/2025 Santos .................. H02M 1/007
2018/0006551 A1 * 1/2018 Park ........................ H02M 7/19
2020/0144810 A1 * 5/2020 Zhou ....................... H02M 1/32
(Continued)

FOREIGN PATENT DOCUMENTS

EP 3192161 B1 7/2017
EP 3726712 A1 10/2020
(Continued)

OTHER PUBLICATIONS

Soto-Sánchez, D., et al. Alternate Arm Converter with Thyristor-based Director Switches, ICA-ACCA 2018, Oct. 17-19, 2018, Greater Concepcion Chile, 6 pgs.
(Continued)

*Primary Examiner* — Stephen W Jackson
(74) *Attorney, Agent, or Firm* — PROCOPIO, CORY, HARGREAVES & SAVITCH LLP

(57) ABSTRACT

Embodiments herein provide a protection method of protecting a Modular Multilevel Converter (MMC) for Direct Current (DC) fault protection in a symmetrical monopole configuration. The MMC for each of at least one phase comprises a leg, which comprises a first branch and a second branch comprising director valves connected in series. Further, legs of the MMC are connected in series between DC poles. The method comprises measuring DC pole voltages relative a common ground and accordingly determining a DC fault identifying a DC pole to ground fault of one of the DC poles. Upon determining the DC fault, the method comprises controlling the director valves of the second branch for each leg to bypass the DC poles through the second branch for protecting a DC pole other than the DC pole identified with the DC fault.

15 Claims, 10 Drawing Sheets

(56) References Cited

U.S. PATENT DOCUMENTS

| | | | | |
|---|---|---|---|---|
| 2020/0161987 | A1 | 5/2020 | Gambach et al. | |
| 2020/0212792 | A1* | 7/2020 | Westerweller | H02M 7/4835 |
| 2020/0366186 | A1 | 11/2020 | Hur et al. | |
| 2022/0224100 | A1* | 7/2022 | Chen | H02H 7/26 |

FOREIGN PATENT DOCUMENTS

| | | | |
|---|---|---|---|
| WO | 03/098787 | A2 | 11/2003 |
| WO | 2016101985 | A1 | 6/2016 |
| WO | 2018145724 | A1 | 8/2018 |
| WO | 2021244806 | A1 | 12/2021 |

OTHER PUBLICATIONS

Gowaid, I.A., A Low-Loss Hybrid Bypass for DC Fault Protection of Modular Multilevel Converters, IEEE Transactions On Power Delivery, vol. 32, No. 2, Apr. 2017, pp. 599-608.

Judge, P.D., et al., The Augmented Trapezoidal Alternate Arm Converter: A Power-Group Augmented DC Fault Tolerant Voltage Source Converter, International High Voltage Direct Current 2016 Conference (HVDC2016), Jan. 2016, 7 pgs.

Judge, P.D., et al., Thyristor-Bypassed Submodule Power-Groups for Achieving High-Efficiency, DC Fault Tolerant Multilevel VSCs, IEEE Transactions On Power Delivery, vol. 33, No. 1, Feb. 2018, pp. 349-359.

Liu, W., et al, Analysis and Protection of Converter-Side AC Faults in a Cascaded Converter-Based MVDC Link: ANGLE-DC Project, IEEE Transactions on Smart Grid, 13(5), Sep. 2022, 11 pgs.

* cited by examiner

DC FAULT MANAGEMENT IN ELECTRICAL POWER SYSTEM

CROSS-REFERENCE TO RELATED APPLICATIONS

The present application claims priority to European Patent Application No. 23198367.7, filed on Sep. 19, 2023, which is hereby incorporated herein by reference as if set forth in full.

TECHNICAL FIELD

The present disclosure generally relates to electrical power systems with symmetrical monopole configurations. More particularly, it relates to providing a protection method, controller, and computer program product for protecting a Modular Multilevel Converter, MMC, for Direct Current, DC, fault protection in a symmetrical monopole configuration.

BACKGROUND

Renewable energy resources (for example, wind farms, photovoltaic, PV, sources, or the like) play a major role in moving towards a carbon-neutral energy system. An electrical power system, for example, a High-Voltage Direct Current, HVDC, system offers flexibility, controllability, and resilience required for large-scale integration of the renewable energy resources and transmission of power from an offshore station to an onshore station. The electrical power system comprises voltage source converters arranged in a symmetrical monopole configuration to transmit an electrical power (i.e., Direct Current, DC, power) from the offshore station to the onshore station over a transmission line connected between the voltage source converters.

FIG. 1A discloses an example electrical power system 100 according to the prior art. For simplicity, the electrical power system 100 comprising two voltage source converters 10 arranged in a symmetrical monopole configuration is depicted in FIG. 1A. Each voltage source converter 10 is connected to an Alternate Current, AC, power source 15, and to a transmission line via DC poles 25 and 30 of the voltage source converter 10. The transmission line comprises DC cables 25*a* and 30*a* suitable for transmission of an electrical/DC power through positive and negative polarities.

In the symmetrical monopole configuration, a DC fault 21 identifying a DC pole to ground fault of one of the DC poles increases a voltage with respect to ground of other DC pole. For example, the DC fault 21 of a DC pole 25 increases a voltage with respect to ground of the DC pole 30, wherein said voltage may exceed a maximum voltage pre-defined for the DC pole 30. Such an overvoltage of the DC pole 30 may cause damages to the electrical power system 100 including the DC cables 25*a* and 30*a*, which further causes significant disruptions and financial loss to a power supplier.

FIG. 1B discloses an example protection arrangement according to the prior art for use in protection of the DC poles 25 and 30 during the DC fault. As depicted in FIG. 1B, the protection arrangement comprises a DC arrester 20 for each of the DC poles 25 and 30. The DC arrester 20 protects the respective DC pole upon determination of the DC fault 21 of the other DC pole. For example, due to the DC fault of the DC pole 20, a voltage of the DC pole 30 may increase. When the increasing voltage of the DC pole 30 is about to exceed a pre-defined threshold value, the DC arrester 20 corresponding to the DC pole 30 may be short-circuited to protect the DC pole 30.

In the prior art, voltage levels of the DC arrester 20 are required to be designed typically more than (for example, 1.7 times) a steady state peak voltage. A voltage rating of each of the DC cables are to be decided based on a voltage withstand level of the DC arrester 20. However, such a voltage level design of the DC arrester 20 and the DC cables may involve huge cost and technical challenge, since the voltage rating design of the existing type of DC cables (for example, Extruded type DC cables) may be still limited. For example, the existing type of DC cable may not be feasible to withstand if a voltage of the DC cable exceeds 640 Kilovolt, KV with increased voltage rating due to the DC fault 21. Also, in most of the cases with even if the voltage of the DC cable exceeds 525 kV, there may be a technical challenge for satisfying overvoltage requirements on the DC cable when considering the DC fault 21.

Thus, there is a need for an improved method and arrangement for DC fault protection in the electrical system with the symmetrical monopole configuration.

SUMMARY

It is therefore an object of the present disclosure to provide a protection method, a controller, and a computer program product for Direct Current, DC, fault protection in a symmetrical monopole configuration, to mitigate, alleviate, or eliminate all or at least some of the above-discussed drawbacks of presently known solutions.

This and other objects are achieved by means of a protection method, a controller, and a computer program product, as defined in the appended claims. The term exemplary is in the present context to be understood as serving as an instance, example or illustration.

According to a first aspect of the present disclosure, a protection method of protecting a Modular Multilevel Converter, MMC, for Direct Current, DC, fault protection in a symmetrical monopole configuration is provided. The MMC for each of at least one phase comprises a leg. The leg comprises a first branch having an upper arm and a lower arm connected in series. The upper arm and the lower arm each comprises submodules configured to contribute to a waveform of an output voltage of the MMC. The leg further comprises a second branch having a first director valve and a second director valve connected in series. The first branch and the second branch are connected in parallel. The legs of the MMC are connected in series between the DC poles of the MMC. The protection method comprises measuring DC pole voltages relative a common ground. The protection method comprises determining based on the measured DC pole voltages, a DC fault identifying a DC pole to ground fault of one of the DC poles. Upon determining the DC fault of a DC pole, the protection method comprises controlling the director valves of the second branch for each leg to bypass the DC poles through the second branch of the director valves for protecting a DC pole other than the DC pole identified with the DC fault.

According to a second aspect of the present disclosure, a controller for protecting a Modular Multilevel Converter, MMC, for DC fault protection in a symmetrical monopole configuration is provided. The MMC for each of at least one phase comprises a leg. The leg comprises a first branch having an upper arm and a lower arm connected in series. The upper arm and the lower arm each comprises submodules configured to contribute to a waveform of an output voltage of the MMC. The leg further comprises a second branch having a first director valve and a second director valve connected in series. The first branch and the second branch are connected in parallel. The legs of the MMC are connected in series between the DC poles of the MMC. The controller comprises a measuring module configured to measure DC pole voltages relative the common ground. The controller further comprises a determination module configured to determine based on the measured DC pole voltages, a DC fault identifying a DC pole to ground fault of one of the DC poles. The controller further comprises a protection module to control, upon determining the DC fault of a DC pole, the director valves of the second branch for each leg to bypass the DC poles through the second branch of the director valves for protecting a DC pole other than the DC pole identified with the DC fault.

A third aspect is an apparatus comprising the controller of the second aspect.

According to a fourth aspect of the present disclosure, an electrical power system is provided. The electrical power system comprises a transmission line comprising Direct Current, DC, cables, a Modular Multilevel Converter, MMC, and a controller of the second aspect. The MMC is arranged in a symmetrical monopole configuration between a first terminal and a second terminal of the transmission line for transmitting electrical power over the transmission line. The MMC for each of at least one phase comprises a leg. The leg comprises a first branch having an upper arm and a lower arm connected in series. The upper arm and the lower arm each comprises submodules configured to contribute to a waveform of an output voltage of the MMC. The leg further comprises a second branch having a first director valve and a second director valve connected in series. The first branch and the second branch are connected in parallel. The legs of the MMC are connected in series between the DC poles of the MMC. The controller of the second aspect is configured to be connected to each leg of the MMC.

According to a fifth aspect of the present disclosure, there is provided a computer program product comprising a non-transitory computer readable medium, having thereon a computer program comprising program instructions. The computer program is loadable into a data processing unit and configured to cause execution of the method according to any of the first to fourth aspects when the computer program is run by the data processing unit.

Advantageously, the proposed invention provides an efficient protection arrangement and method for the DC fault protection with reduced converter cost and footprint. With the DC fault protection, a voltage withstand level of the DC cables may be reduced for the symmetrical monopole configuration with reduced cost.

Other advantages may be readily apparent to one having skill in the art. Certain embodiments may have some, or all of the recited advantages.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
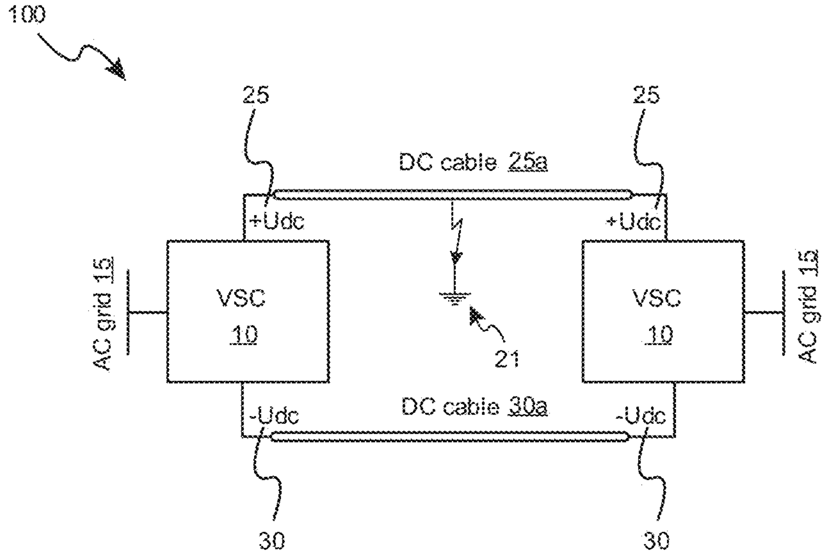
FIG. 1A discloses an example electrical power system according to the prior art.

Aspects of the present disclosure will be described more fully hereinafter with reference to the accompanying drawings. The apparatus and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only and is not intended to limit the invention. It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Direct Current, DC pole voltages: As used herein, "DC pole voltages" may refer to output voltages of DC poles of a Modular Multilevel Converter, MMC.

DC fault: As used herein "DC fault" may refer to a DC pole to ground fault.

Unhealthy DC pole: As used herein, "unhealthy DC pole" may refer to a DC pole determined with a DC fault.

Healthy DC pole: As used herein, "healthy DC pole" may refer to a DC pole other than the DC pole determined with the DC fault.

In general, an electrical power system is required for large-scale integration of renewable energy resources and transmission of power from an offshore station to an onshore station.

Figure 1B:
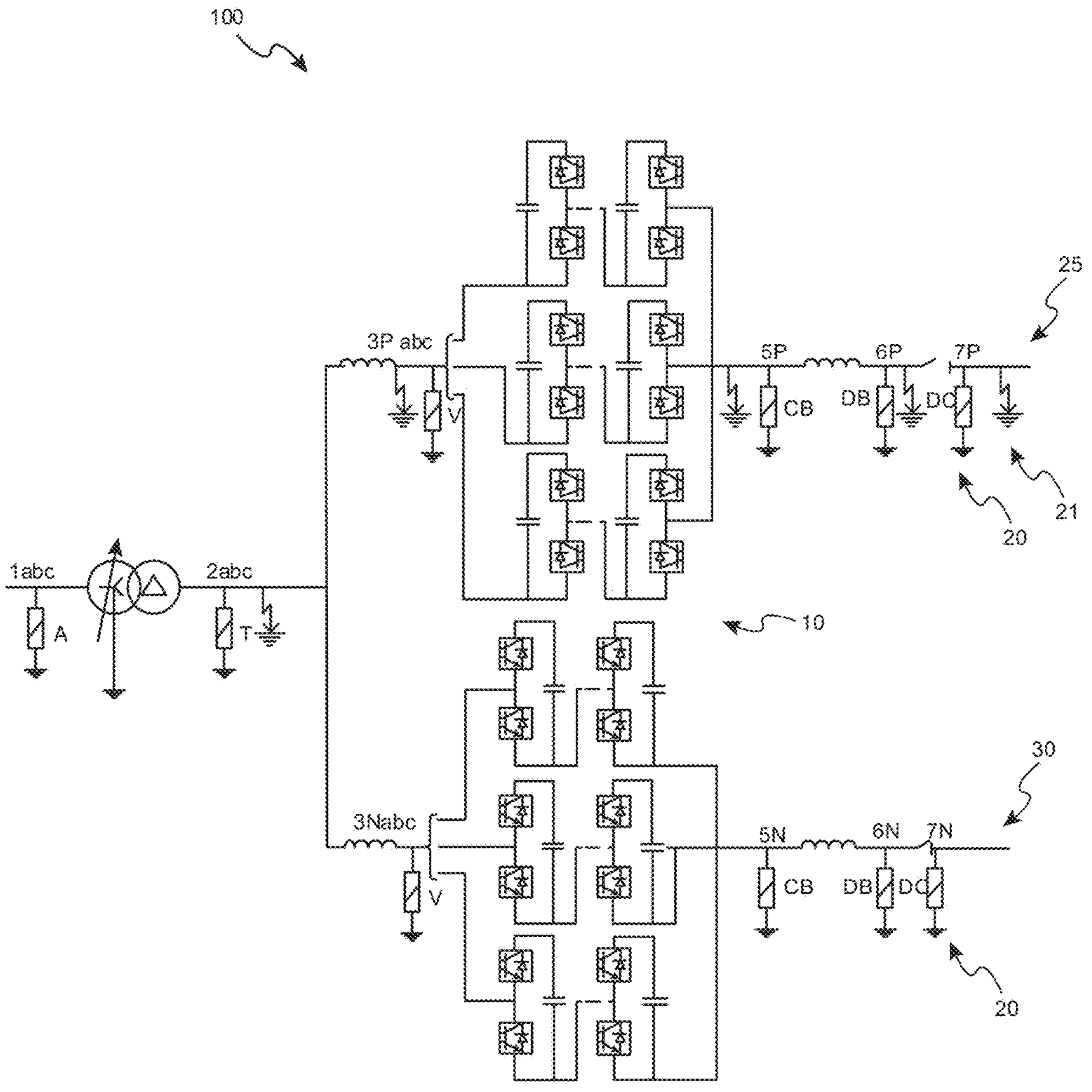
FIG. 1B discloses an example protection arrangement according to the prior art for use in protection of Direct Current, DC, poles, due to a DC fault.

According to the prior art, as depicted in FIGS. 1A and 1B, the electrical power system comprises converters (for example, voltage source converters) arranged in a symmetrical monopole configuration to connect to an Alternate Current, AC, power source and to a transmission line via Direct Current, DC, poles for transmission of an electrical power. The transmission line comprises DC cables suitable for transmission of the electrical power. In the symmetrical monopole configuration, a DC fault identifying a DC pole to ground fault of one of the DC poles causes voltage of other DC fault to increase and exceed a maximum voltage predefined for the other DC fault. Thereby, causing damages to the DC pole.

In the prior art, a DC arrester may be used to protect the DC poles during the DC fault. However, a voltage rating design of the DC arrester may involve huge cost and technical challenge.

In contrast to the prior art, embodiments herein provide an electrical power system with an improved protection arrangement for DC fault protection in the symmetrical monopole configuration.

Figure 2:
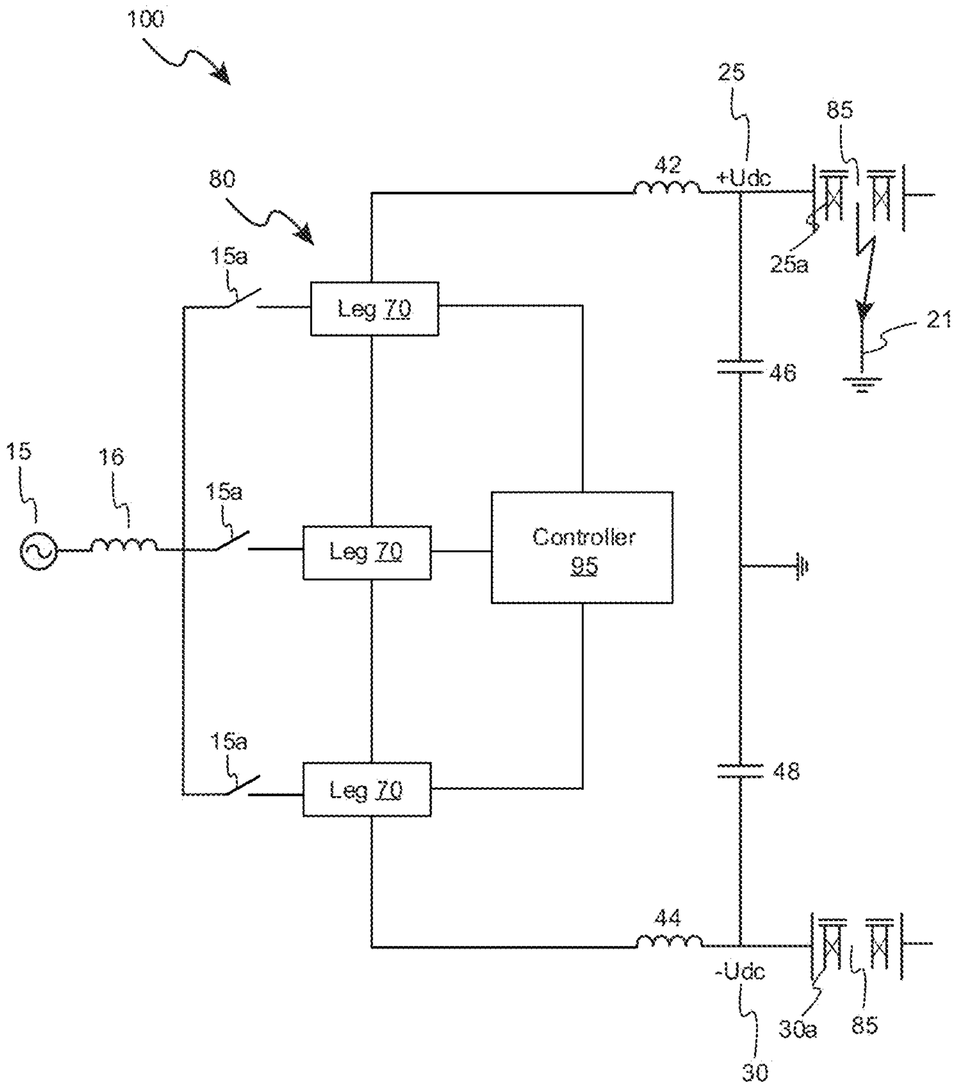
FIG. 2 discloses an electrical power system comprising a controller for protecting a Modular Multilevel Configuration, MMC, for DC fault protection in a symmetrical monopole configuration, according to one embodiment of the present invention.

FIG. 2 discloses an electrical power system 100. The electrical power system 100 referred herein may be connected to renewable sources such as large windfarms, photovoltaic, PV, sources, or the like, for supporting high power onshore and offshore renewable energy transmissions. In some examples, the electrical power system 100 may be a High-Voltage Direct Current, HVDC, system.

As depicted in FIG. 2, the electrical power system 100 comprises a transmission line 85. The transmission line 85 comprises Direct Current, DC, cables 25*a* and 30*a* suitable for transmission of an electrical power, for example, DC power.

The electrical power system 100 further comprises a Modular Multilevel Converter, MMC, 80. The MMC 80 is arranged in a symmetrical monopole configuration. At a first end, the MMC 80 is connected to an Alternate Current, AC, power source 15 through a resistor 16. At a second end, the MMC 80 is connected between a first terminal and a second terminal of the transmission line 85 via DC poles 25 and 30. The MMC 80 is configured for performing voltage conversions and transmitting electrical power (i.e., DC power) over the transmission line 85.

In accordance with embodiments disclosed herein, the MMC 80 comprises legs 70 for phases 15*a*, 15*b*, and 15*c* of the AC power source 15. The legs 70 are connected in series between the DC poles 25 and 30 of the MMC 80. In an example, as depicted in FIG. 2, the legs are connected in series between the DC poles 25 and 30 of the MMC 80 via the resistors 42 and 44.

Figure 3A:
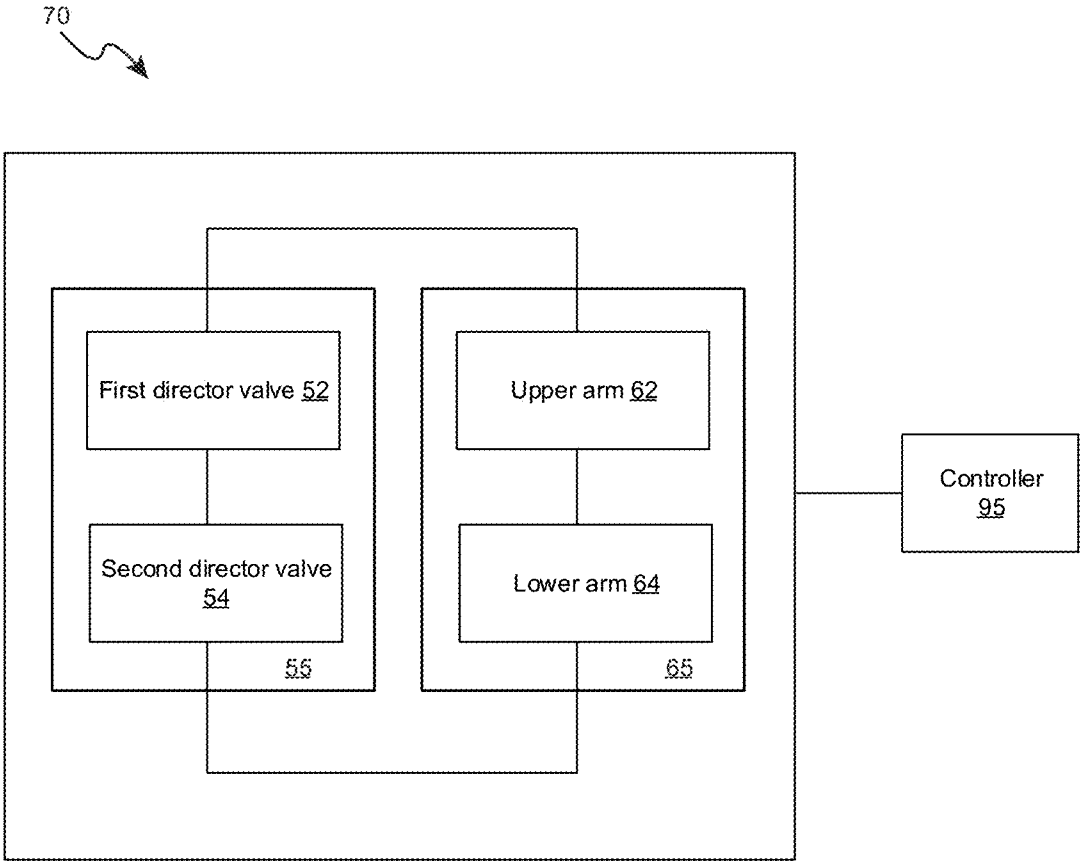
FIGS. 3A, 3B, and 3C disclose components of a leg of a MMC connected to a controller, according to one embodiment of the present invention.
Figure 3B:
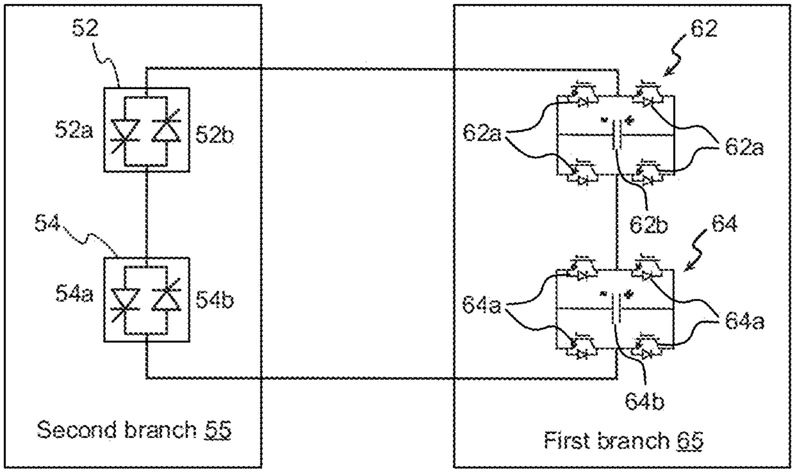
Figure 3C:
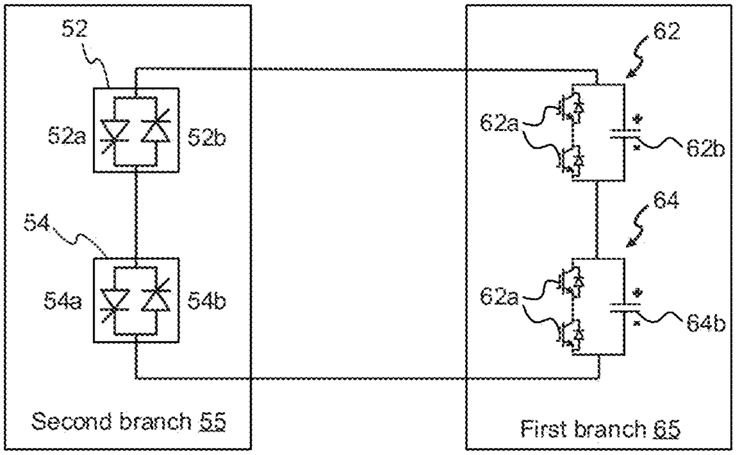

A leg 70 for each phase is disclosed in FIGS. 3A, 3B, and 3C. The leg 70 of the MMC 80 disclosed in FIGS. 3A, 3B, and 3C comprises a first branch 65 and a second branch 55. The first branch 65 and the second branch 55 are connected in parallel.

The first branch 65 comprises an upper arm 62 and a lower arm 64. The upper arm 62 and the lower arm 64 are connected in series. The upper arm 62 and lower arm 64 each comprises submodules configured to contribute to a waveform of an output voltage of the MMC 80. In an example, as depicted in FIG. 3B, the submodules of each of the upper arm 62 and the lower arm 64 may comprise full-bridge submodules/full-bridge inverter. The full-bridge submodules may include four switching elements 62*a*/64*a* with a cell capacitor 62*b*/64*b*. In another example, as depicted in FIG. 3C, the submodules of each of the upper arm 62 and the lower arm 64 may comprise half-bridge submodules/half-bridge inverter. The half-bridge submodules may include two switching elements 62*a*/64*a* with a cell capacitor 62*b*/64*b*. Examples of the switching elements 62*a*/64*a* referred herein may include, but are not limited to, an Insulated Gate Bipolar Transistor, IGBT, Integrated Gate-Commutated Thyristor, IGCT, and so on.

The second branch 55 comprises a first director valve 52 and a second director 54 valve connected in series. In an example, as depicted in FIGS. 3B and 3C, each of the first director valve 52 and the second director valve 54 comprises a series connected antiparallel thyristor pair (52*a*, 52*b*)/(54*a*, 54*b*). Thus, the proposed modular multilevel configuration of the MMC 80 may reduce converter cost, footprint, and handle ultra-high DC voltage.

Referring again to FIG. 2, the electrical power system 100 further comprises a controller 95 connected to each leg 70 of the MMC 80. The controller 95 is configured to protect the MMC 80 for DC fault protection in the symmetrical monopole configuration. For DC fault protection, the controller 95 measures DC pole voltages relative a common ground. The DC pole voltages herein refer to output voltages of the DC poles 25 and 30 of the MMC 80 relative the common ground. Based on the measured DC pole voltages, the controller 95 determines a DC fault 21 identifying a DC pole to ground fault of one of the DC poles 25 and 30. Upon determining the DC fault of one of the DC poles 25 and 30, the controller 95 controls the director valves of the second branch for each leg 70 in the MMC 80 to bypass the DC poles through the second branch of the director valves. Thus, providing an effective protection arrangement and method for DC fault protection in the symmetrical monopole configuration.

Various embodiments for DC fault protection in the symmetrical monopole configuration are disclosed in conjunction with figures in the later parts of the description.

Figure 4:
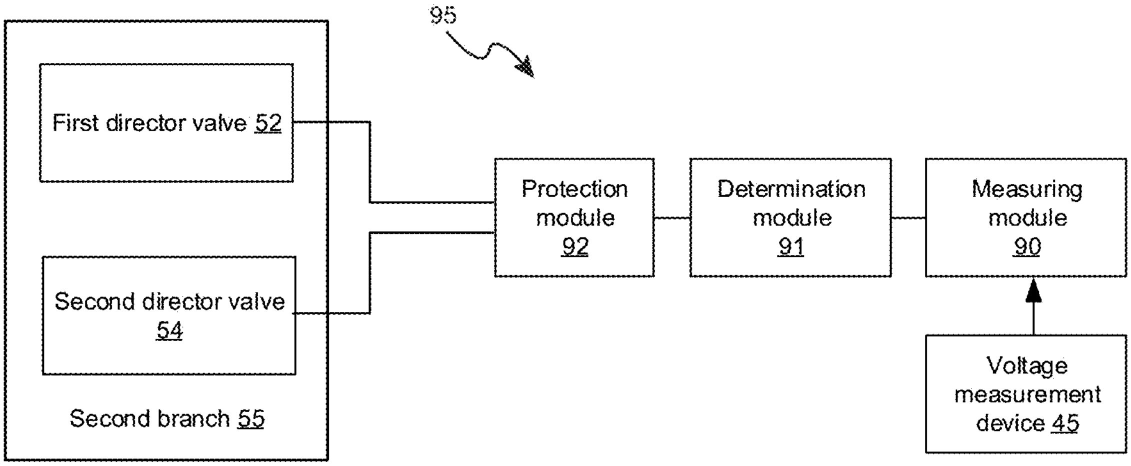
FIG. 4 discloses functional components of a controller, according to one embodiment of the present invention.

FIG. 4 discloses functional components of a controller 95. The controller 95 is configured to be connected to each leg 70 of the MMC to protect the MMC for DC fault protection in the symmetrical monopole configuration. As depicted in FIG. 4, the leg 70 comprises the second branch 55 having the first director valve 52 and the second director valve 54.

The controller 95 depicted in FIG. 4 comprises a measuring module 90, a determination module 91, and a protection module 92.

The measuring module 90 is configured to measure DC pole voltages relative the common ground. The DC pole voltages refer to output voltages of the DC poles of the MMC relative the common ground. The measuring module 90 receives voltage parameters from a voltage measurement device 45. The voltage measurement device 45 may be configured to be connected to the DC poles of the MMC. In some examples, the voltage parameters from the voltage measurement device 45 may identify output voltages of the DC poles. Based on the received voltage parameters, the measuring module 90 measures the DC pole voltages relative the common ground.

The determination module 91 is configured to determine a DC fault identifying a DC pole to ground fault of one of the DC poles. The determination module 91 determines whether the measured DC pole voltages relative the common ground exceeds a pre-defined threshold voltage with a dynamic margin (for example, 1.3~1.4 pu). When it has been determined that the measured one of the DC pole voltages relative the common ground exceeds the pre-defined threshold voltage, the determination module 91 determines the DC fault of the corresponding DC pole.

Upon determining the DC fault of one of the DC poles, the protection module 92 is configured to control director valves 52 and 54 of the second branch 55 for each leg 70 in the MMC to bypass the DC poles through the second branch 55 of director valves 52 and 54.

According to some embodiments, for controlling the director valves 52 and 54 of the second branch 55, the protection module 92 may determine a time interval for controlling the director valves of the second branch 55 for each leg 70 of the MMC. The protection module 92 may transmit a command sequence for controlling the director valves 52 and 54 of the second branch 55 for each leg 70 for the determined time interval to bypass the DC poles through the second branch 55 of director valves 52 and 54.

Bypassing of the DC poles through the second branch 55 of director valves 52 and 54 controls for example, reduces voltage of the DC pole other than the DC pole identified with the DC fault. Said voltage of the DC pole other than the DC pole identified with the DC pole increases due to the DC fault and exceeds a maximum voltage pre-defined for the DC pole. Thus, controlling the voltage of the DC pole protects said DC pole from the determined DC fault of the other DC pole.

Figure 5A:
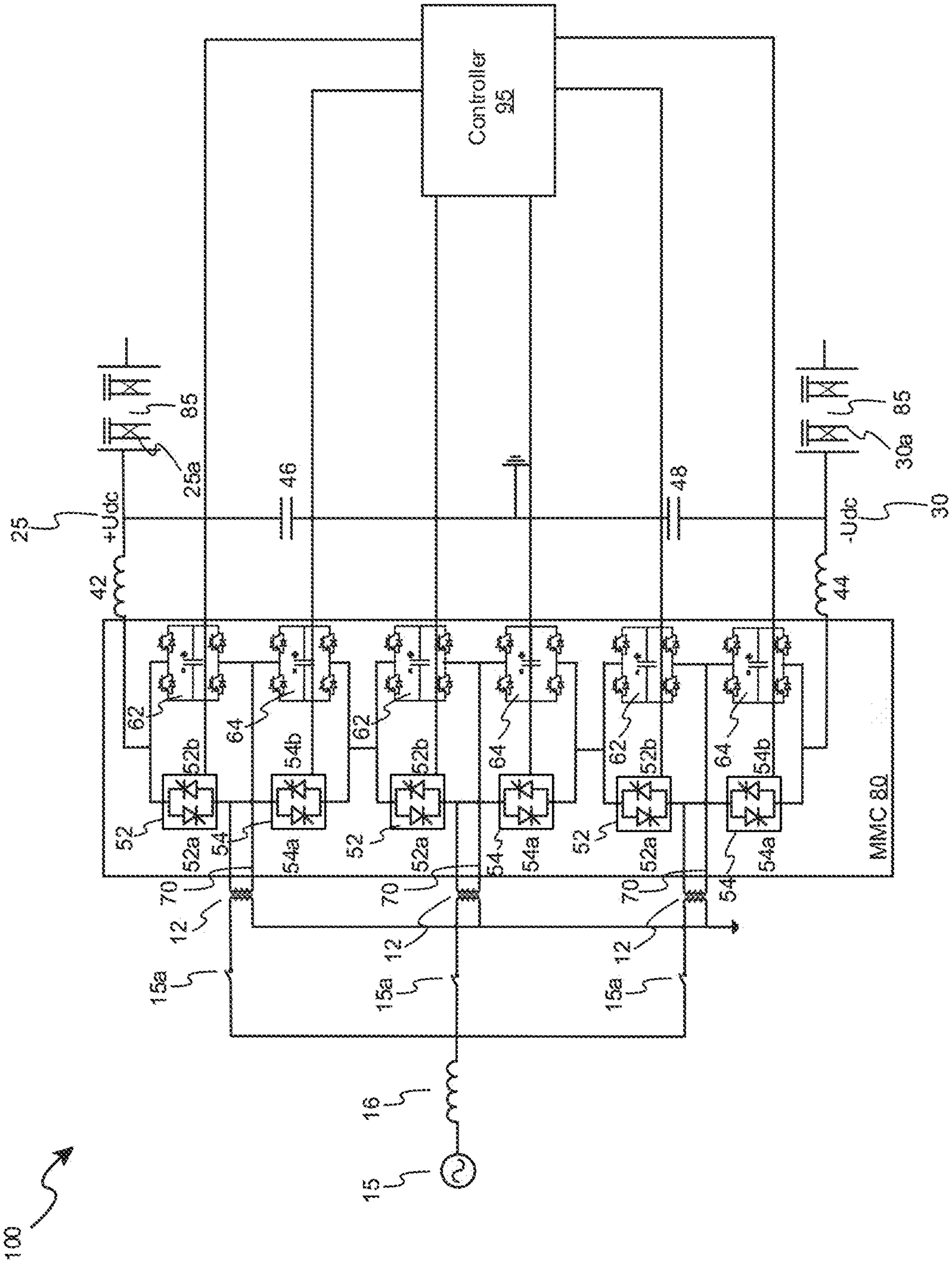
FIGS. 5A and 5B illustrate DC fault management in an example electrical power system, according to one embodiment of the present invention.
Figure 5B:
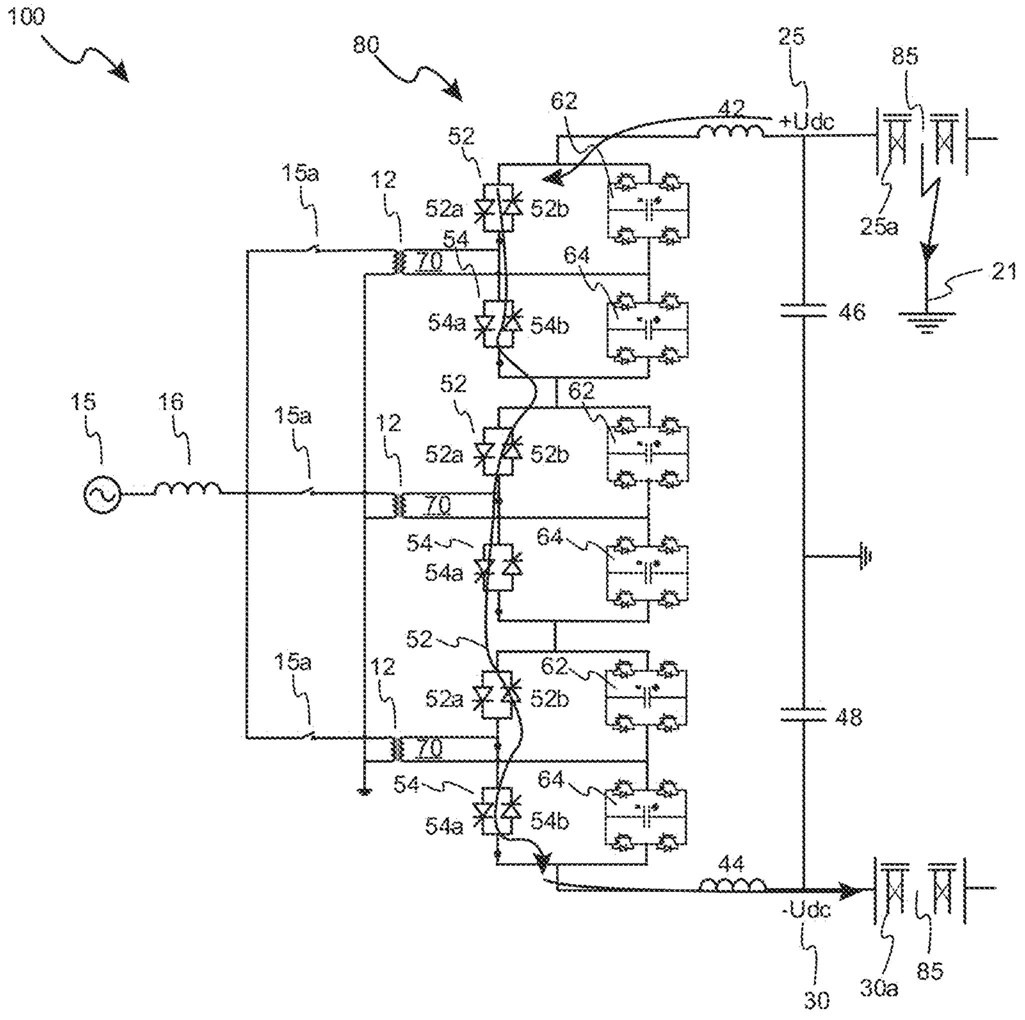

FIGS. 5A and 5B illustrate DC fault management in an electrical power system 100. The electrical system 100 comprises a MMC 80 arranged in a symmetrical monopole configuration between the AC power source 15 and the transmission line 85. The MMC 80 is connected to the AC power source 15 via suitable components such as a transformer 12, resistor 16, or the like. The MMC 80 is connected to the transmission line 85 via the DC poles 25 and 30 of the MMC 80. The transmission line 85 comprises DC cables 25*a* and 30*a* suitable for transmission of the electrical power/DC power through positive and negative polarities.

The MMC 80 referred herein may be a series modular multilevel converter configured for voltage conversions. The MMC 80 depicted in FIGS. 5A and 5B comprises legs 70 for three AC phases 15*a*, 15*b*, and 15*c*. The legs 70 are connected in series between the DC poles 25 and 30 (+Udc and −Udc) of the MMC 80. In some examples, the legs 70 may be connected in series between the DC poles 25 and 30 via resistors 42 and 44. Further, the DC poles 25 and 30 may be associated with capacitors 46 and 48.

The leg 70 for each phase comprises the first branch 65 having the upper arm 62 and the lower arm 64 connected in series. Each of the upper arm 62 and the lower arm 64 comprises submodules configured to contribute to a waveform of an output voltage of the MMC 80. In some examples, the submodules may comprise full-bridge submodules/full-bridge inverter, as depicted in FIGS. 5A and 5B. The full-bridge submodules include four switching elements with a cell capacitor. In some examples, the submodules may comprise half-bridge submodules/half-bridge inverter. The half-bridge submodules may include two switching elements with a cell capacitor. Examples of the switching elements referred herein may include, but are not limited to, an Insulated Gate Bipolar Transistor, IGBT, Integrated Gate-Commutated Thyristor, IGCT, and so on.

The leg 70 further comprises the second branch 55 arranged to be connected to the first branch 65 in parallel. The second branch 55 comprises the first director valve 52 and the second director valve 54. Each of the first director valve 52 and the second director valve 54 comprises a series connected antiparallel thyristor pair (52*a*, 52*b*)/(54*a*, 54*b*).

Referring to FIG. 5A, the electrical power system 100 comprises a controller 95 connected to each leg 70 of the MMC 80. The controller 95 is configured to manage DC fault in the electrical power system 100.

The controller 95 measures the DC pole voltages relative a common ground (i.e., output voltages of the DC poles 25 and 30 relative the common ground). Based on the measured DC pole voltages, the controller 95 determines a DC fault 21 identifying a DC pole to ground fault of one of the DC poles 25 and 30. For example, as depicted in FIGS. 5A and 5B, the controller 95 determines the DC fault 21 of a DC pole 25 (i.e., the DC pole 25 is a unhealthy DC pole herein). The DC fault 21 of the DC pole 25 increases voltage of other DC pole 30, said voltage may exceed a maximum voltage pre-defined for the DC pole 30. Thereby, damaging healthy DC pole 30.

In order to protect the DC pole 30, the controller 95 controls the director valves 52 and 54 of each of the second branch 55 for each leg 70. In particular, for controlling the director valves 52 and 54 of the second branch 55 for each leg 70, the controller 95 determines a time interval and transmits a command sequence for controlling the director valves 52 and 54 to the determined time interval. Controlling the director valves 52 and 54 may refer to turning ON/firing of each of the thyristors (52*a*, 52*b*, 54*a*, and 54*b*) of each of the director valves 52 and 54 and controlling a gate voltage of each of the thyristors (52*a*, 52*b*, 54*a*, and 54*b*) of each of the director valves 52 and 54 for the determined time interval. In some examples, the command sequence may indicate a voltage limit up to which the gate voltage of each of the thyristors (52*a*, 52*b*, 54*a*, and 54*b*) of each of the director valves 52 and 54 has to be controlled. The voltage limit may be determined based on a withstanding voltage of the thyristors. The proposed firing method herein for the thyristors is very fast to execute as similar to protective firing of the thyristors.

Such a firing of the thyristors of the director valves 52 and 54 bypasses the DC poles 25 and 30 through the second branch 55 of the director valves 52 and 54, as depicted in FIG. 5B. Thereby, the DC poles 25 and 30 may be short-circuited, which results in less voltage throughout the length of the DC cables 25*a* and 30*a* and there may not be any source for a travelling wave, which may cause huge impact on overvoltage in a middle of the DC cables 25*a* and 30*a*. The short-circuit of the DC poles 25 and 30 further controls/reduces the increasing voltage of the DC pole 30 due to the DC fault 21 of the DC pole 25. Thus, the healthy DC pole 30 may be protected from damages to be caused by the increased voltage with respect to ground.

In some examples, bypassing of the DC poles 25 and 30 through the second branch 55 of the director valves 52 and 54 may be activated after the MMC 80 is blocked. Thus, resulting in more effective bypassing scheme.

As would be understood, in FIGS. 5A and 5B, the DC fault 21 of the DC pole 25 is considered. However, the DC fault 21 may occur in the other DC pole 30 as well. In such a scenario, the controller 95 may perform the above-described operations to protect the DC pole 25 from the DC fault 21 of the DC pole 30.

Figure 6:
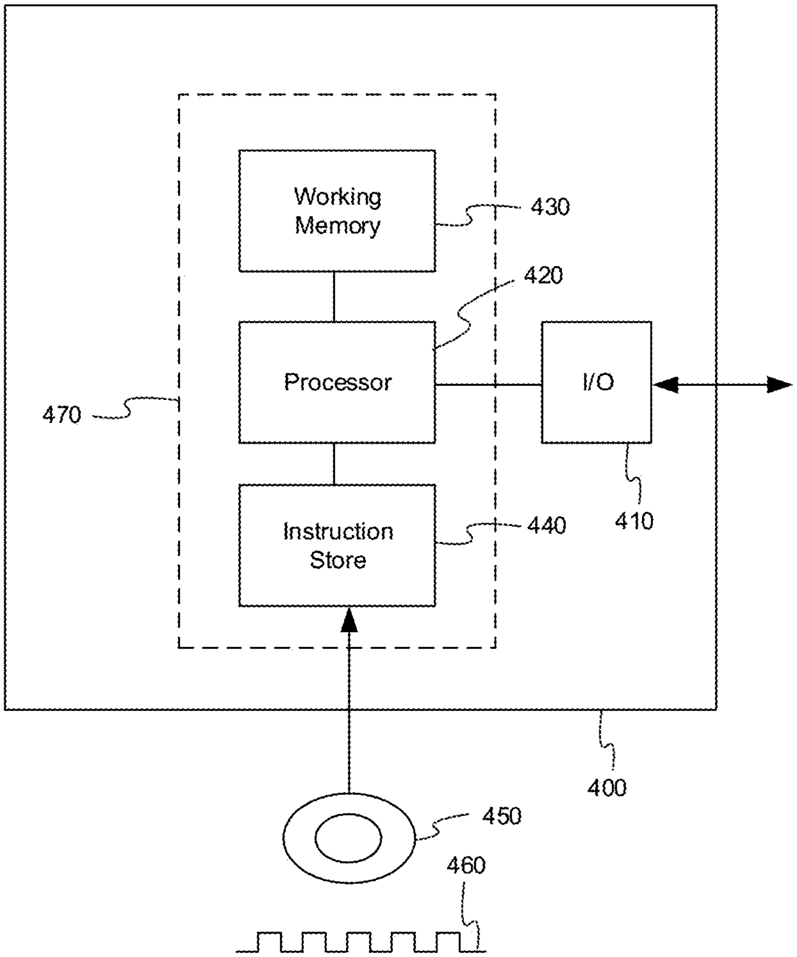
FIG. 6 discloses an exemplary hardware implementation of a controller depicted in FIG. 4, according to one embodiment of the present invention.

FIG. 6 discloses an exemplary implementation of the controller in programmable signal processing hardware. A signal processing apparatus 400 depicted in FIG. 6 comprises an input/output, I/O, section 410 for receiving voltage parameters of the DC poles of the MMC and transmitting a command sequence for controlling the director valves of the second branch for each leg in the MMC. The signal processing apparatus 400 further comprises a processor 420, a working memory 430, and an instruction store 440 storing computer readable instructions which, when executed by the processor 420, cause the processor 420 to perform processing operations hereinafter described to protecting the MMC for DC fault protection in the symmetrical monopole configuration. The instruction store 440 may comprise a Read Only Memory, ROM, or similar type of memory, and the computer readable instructions can be input thereto from a computer program product, such as a computer-readable storage medium 450 such as Compact Disk, CD-ROM, etc, or a computer-readable signal 460 carrying the computer-readable instructions.

In the present embodiment, the combination of 470 of the hardware components depicted in FIG. 6, comprising the processor 420, the working memory 430, and the instruction store 440, is configured to implement the functionality of the aforementioned measuring module 90, determination module 91, and protection module 92, which will now be described in detail with reference to FIG. 7.

Figure 7:
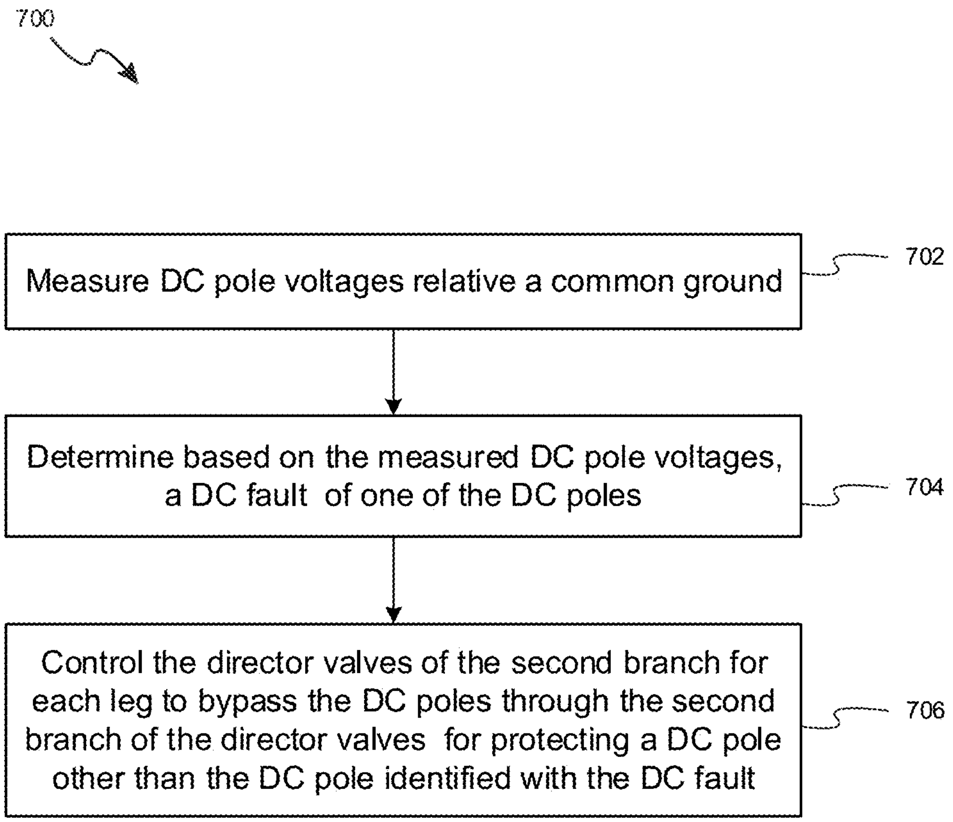
FIG. 7 is a flowchart illustrating example method steps, according to one embodiment of the present invention.

FIG. 7 is a flowchart illustrating method steps of a protection method 700 performed by the controller to protect the MMC for the DC fault protection in the symmetrical monopole configuration. The MMC is already described in detail in conjunction with FIGS. 2, 3, 4, and 5*a*-5*b*, thus, repeated description of the MMC is omitted herein.

At step 701, the measuring module 90 measures DC pole voltages relative a common ground. In some embodiments, the measuring module 90 may receive voltage parameters from the voltage measuring device connected to the DC poles and measure the DC pole voltages relative the common ground based on the received voltage parameters.

At step 702, the determination module 91 determines the DC fault identifying a DC pole to ground fault of one of the DC poles based on the measured DC pole voltages. In some embodiments, the determination module 91 may determine whether the measured DC pole voltage relative the common ground exceeds a pre-defined threshold voltage. When it has been determined that the measured one of the DC pole voltages relative the common ground exceeds the pre-defined threshold voltage, the determination module may determine the DC fault of the corresponding DC pole.

Upon determining the DC fault of one of the DC poles, at step 706, the protection module 92 controls the director valves of the second branch for each leg to bypass the DC poles through the second branch of the director valves for protecting a DC pole other than the DC pole identified with the DC fault. The voltage of the DC pole other than the DC pole identified with the DC fault increases due to the DC fault and exceeds a maximum voltage pre-defined for the DC pole. Thus, bypassing of the DC poles by controlling the director valves may reduce such an overvoltage of the DC pole due to the DC fault of the other DC pole.

In some embodiments, the protection module 92 may determine a time interval and transmit a command sequence for controlling of the director valves of the second branch for each leg to the determined time interval. Thus, improving protection of the MMC for DC fault protection in the symmetrical monopole configuration.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors, DSPs, special-purpose digital logic, and the like. The processing circuitry may be configured to execute program code stored in memory, which may include one or several types of memory such as read-only memory (ROM), random-access memory, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

What is claimed is:

1. A protection method of protecting a Modular Multilevel Converter (MMC) for Direct Current (DC) fault protection in a symmetrical monopole configuration, wherein the MMC for each of at least one phase comprises:
- a leg comprising:
  - a first branch having an upper arm and a lower arm connected in series, wherein the upper arm and the lower arm each comprises submodules configured to contribute to a waveform of an output voltage of the MMC; and
  - a second branch having a first director valve and a second director valve connected in series;
  - wherein the first branch and the second branch are connected in parallel;

wherein legs of the MMC are connected in series between DC poles of the MMC, the method comprising:
- measuring DC pole voltages relative a common ground;
- determining based on the measured DC pole voltages, a DC fault identifying a DC pole to ground fault of one of the DC poles; and
- upon determining the DC fault of a DC pole, controlling the director valves of the second branch for each leg to bypass the DC poles through the second branch of the director valves for protecting a DC pole other than the DC pole identified with the DC fault.

2. The protection method according to claim 1, wherein a voltage of the DC pole other than the DC pole identified with the DC fault increases due to the DC fault, and exceeds a maximum voltage pre-defined for the DC pole.

3. The protection method according to claim 1, wherein the step of controlling the director valves of the second branch for each leg comprises:
- determining a time interval for controlling the director valves of the second branch for each leg; and
- transmitting a command sequence for controlling the director valves of the second branch for each leg for the determined time interval.

4. The protection method according to claim 1, wherein the step of determining the DC fault comprises:
- determining whether the measured DC pole voltages relative the common ground exceeds a pre-defined threshold voltage; and
- when it has been determined that the measured one of the DC pole voltages relative the common ground exceeds the pre-defined threshold voltage, determining the DC fault of the corresponding DC pole.

5. The protection method according to claim 1, wherein the step of measuring the DC pole voltages comprises:
- receiving voltage parameters from a measurement device configured to be connected to the DC poles; and measuring the DC pole voltages relative the common ground based on the received voltage parameters.

6. A non-transitory computer-readable medium, having thereon a computer program comprising program instructions, the computer program is loadable into a data processing unit and configured to cause execution of the method according to claim 1 when the computer program is run by the data processing unit.

7. A controller for protecting a Modular Multilevel Converter (MMC) for Direct Current (DC) fault protection in a symmetrical monopole configuration, wherein the MMC for each of at least one phase comprises:

a leg comprising:

a first branch having an upper arm and a lower arm connected in series, wherein the upper arm and the lower arm each comprises submodules configured to contribute to a waveform of an output voltage of the MMC; and a second branch having a first director valve and a second director valve connected in series;

wherein the first branch and the second branch are connected in parallel;

wherein legs of the MMC are connected in series between DC poles of the MMC, the controller comprises:

a measuring module configured to:

measure DC pole voltages relative the common ground;

a determination module configured to:

determine based on the measured DC pole voltages, a DC fault identifying a DC pole to ground fault of one of the DC poles; and a protection module configured to:

control, upon determining the DC fault of a DC pole, the director valves of the second branch for each leg to bypass the DC poles through the second branch of the director valves for protecting a DC pole other than the DC pole identified with the DC fault.

8. The controller according to claim 7, wherein a voltage of the DC pole other than the DC pole identified with the DC pole increases due to the DC fault and exceeds a maximum voltage pre-defined for the DC pole.

9. The controller according to claim 7, wherein the protection module is configured for controlling the director valves of the second branch for each leg by causing:

determination of a time interval for controlling the director valves of the second branch for each leg; and transmission of a command sequence for controlling the director valves of the second branch for each leg for the determined time interval.

10. The controller according to claim 7, wherein the determination module is configured for determining the DC fault by causing:

determination of whether the measured DC pole voltages relative the common ground exceeds a pre-defined threshold voltage; and determination of the DC fault of the DC pole, when it has been determined that a measured DC pole voltage relative the common ground corresponding to said pole exceeds the pre-defined threshold voltage.

11. The controller according to claim 7, wherein the measuring module is configured for measuring the DC pole voltages by causing:

reception of the voltage parameters from a measurement device configured to be connected to the DC poles; and measurement of the DC pole voltages relative the common ground based on the received voltage parameters.

12. An apparatus comprising the controller of claim 7.

13. An electrical power system comprising:

a transmission line comprising Direct Current (DC) cables;

a Modular Multilevel Converter (MMC) arranged in a symmetrical monopole configuration between a first terminal and a second terminal of the transmission line for transmitting electrical power over the transmission line, wherein the MMC for each of at least one phase comprises a leg, wherein the leg comprises:

a first branch having an upper arm and a lower arm connected in series, wherein the upper arm and the lower arm each comprises submodules configured to contribute to a waveform of an output voltage of the MMC; and a second branch having a first director valve and a second director valve connected in series;

wherein the first branch and the second branch are connected in parallel;

wherein legs of the MMC are connected in series between the DC poles of the MMC; and the controller of claim 6, said controller configured to be connected to each leg of the MMC.

14. The electrical power system according to claim 13, wherein the first director valve and the second director valve each comprises a series connected antiparallel thyristor pair.

15. The electrical power system according to claim 13, wherein the electrical power system is a High Voltage Direct Current (HVDC) system.

* * * * *